United States Patent

Collin

[11] 4,080,511
[45] Mar. 21, 1978

[54] APPARATUS FOR THE MELT REDUCTION OF FINE-GRAINED IRON OXIDE MATERIAL

[75] Inventor: Per Harald Collin, Falun, Sweden
[73] Assignee: ASEA Aktiebolag, Vesteras, Sweden
[21] Appl. No.: 672,342
[22] Filed: Mar. 31, 1976
[30] Foreign Application Priority Data
  Apr. 2, 1975 Sweden .............................. 75037838
[51] Int. Cl.$^2$ .............................................. F27D 3/00
[52] U.S. Cl. ................................................. 13/33
[58] Field of Search ........................ 13/33, 9 R, 9 ES

[56] References Cited

U.S. PATENT DOCUMENTS

| | | | |
|---|---|---|---|
| 3,101,385 | 8/1963 | Robinson | 13/33 |
| 3,721,743 | 3/1973 | Shiina | 13/33 X |
| 3,940,551 | 2/1976 | Ling et al. | 13/9 R |

*Primary Examiner*—R. N. Envall, Jr.
*Attorney, Agent, or Firm*—Kenyon & Kenyon, Reilly, Carr & Chapin

[57] ABSTRACT

For the melt reduction in a DC electric arc furnace of iron oxide material of such a fine grain size that it can be blown about by the action of an electric arc, a hearth for the iron melt used, is provided with an outer wall and a roof down through which an arcing electrode extends with its tip positioned to form an arc with the melt, the electrode having a lengthwise passage through which the fine-grained oxide material, together with equally fine-grained particles of carbonaceous material, are fed to the tip. This prevents substantial loss of the materials by their being blown away from the arc. The arc, unshielded by the flow of materials, can produce from the space radiation damaging to furnace linings. To prevent the effect of such radiation, at least the electrode tip is surrounded by a coke bed floating on the melt and retained by a partition depending from the roof symmetrically around the electrode, down to a level spaced above the melt level, the lower portion of the coke bed closing the space between the partition and the melt. The partition forms an outer space within the wall and under the roof and to which the reaction gases can flow via the interface between the coke bed and the melt and possibly through the particles of coke, to this outer space, the latter having means for exhausting the gases. The coke bed permits the arc to operate while acting as a barrier against the arc radiation, while the coke bed at the same time permits the reaction gases to flow under the bed to the outer space for discharge from the apparatus, the bed shielding the furnace construction above, against the heat of the discharging gases.

1 Claim, 4 Drawing Figures

U.S. Patent  March 21, 1978  4,080,511
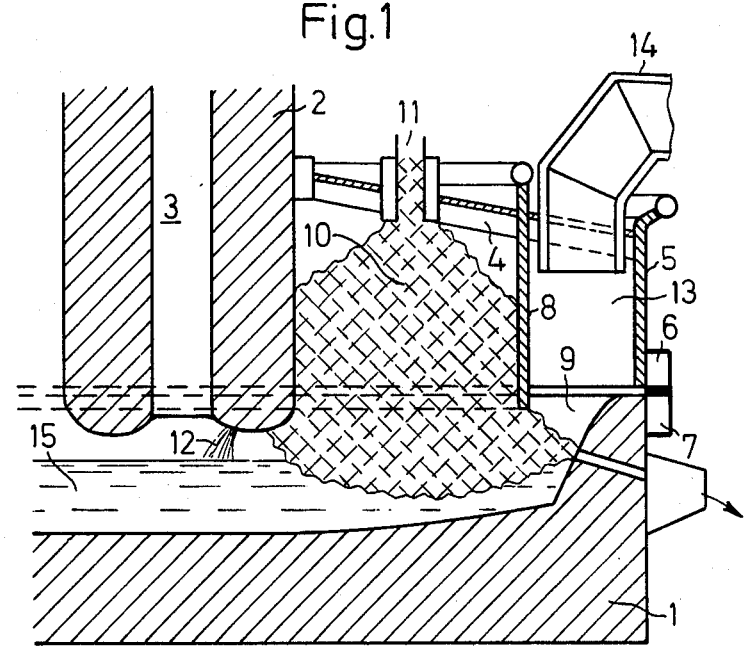
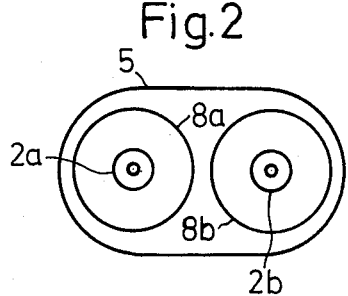 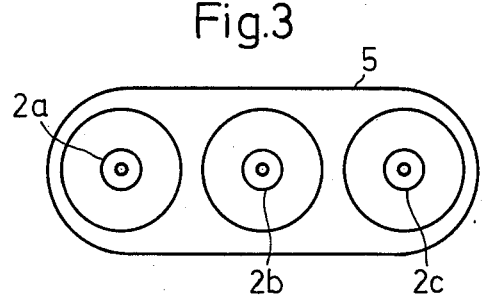
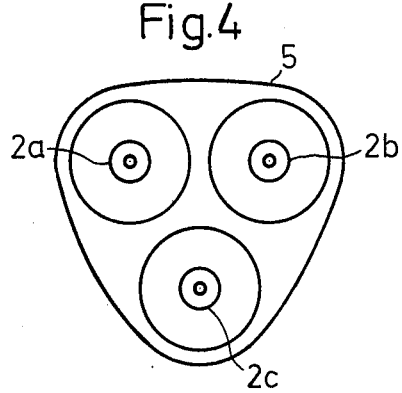

APPARATUS FOR THE MELT REDUCTION OF FINE-GRAINED IRON OXIDE MATERIAL

BACKGROUND OF THE INVENTION

The present invention relates to the melt reduction of iron oxides. This practice fundamentally involves feeding iron oxides, possibly in the form of iron ore, mixed with carbonaceous material, such as coke particles, to an iron melt where the carbon reacts with the oxides so that the iron is added to the melt, the reaction gases being discharged from the enclosure of the furnace containing the iron melt.

When practiced conventionally by the use of a direct current electric arc furnace, with the arcing electrode cathodic and the melt anodic, the materials, normally intermixed, must be of a relatively large particle size to prevent them from being blown about by the gases evolving from the melt and by action of the arc, so as to be lost by being carried away via discharged reaction gases. It is desirable to have the reducing reaction proceed as rapidly as possible, this suggesting that the particles of the materials be reduced to a fine grained condition, such as in the form of powder.

The use of a direct current arc formed between a cathodic arcing electrode and an anodic iron melt, is advantageous because the action of the arc displaces slag floating on the melt, to form a bare spot of iron free from slag, the presence of slag interfering with the desired reaction.

U.S. Pat. No. 3,940,551, dated Feb. 24, 1976, discloses the use of a tubular arcing electrode operated as a cathode, the melt being the anode, this permitting very fine-grained iron oxide material and carbonaceous material to be fed directly into the arc of a DC arc furnace, the arc action displacing any slag to form a spot of bare iron, to which the powdered materials are fed directly, the magnet and electrical forces of the arc having the effect of confining the flow of powdered materials.

However, the above patented invention has the disadvantage that the refractory lining of any furnace used, is directly exposed to the arc flare with attendant danger of early lining deterioration. The constantly fed flow of fine-grained or powdered materials is to the inside of the arc electrode having the vertical feeding passage or hole; the feed materials can have no shading or shielding action with respect to the arc flare.

SUMMARY OF THE INVENTION

The present invention is an improvement providing for enjoyment of all the advantages of the above-patented invention while providing for shielding the wall and roof of the furnace enclosure used above the hearth containing the iron melt, from the arc flare or radiation.

Briefly stated, this invention comprises an apparatus having a hearth for containing the iron melt, one or more vertical cathodic DC arcing electrodes each having a lengthwise passage through which the fine-grained mixed materials are fed, and having a tip positioned to form an arc with the melt to which the fine-grained or powdered materials are fed via the tip and directly into the arc.

An outer wall upstands from the hearth and surrounds and is spaced from the electrode and connects with a roof through which the electrode extends, the wall and roof substantially gas-tightly enclosing a space above and around the electrode tip and the melt. An inner partition depends gas-tightly from this roof into that space, to a level spaced above the melt, and substantially concentrically surrounds the electrode so as to form an inner annular open-bottomed space around the electrode, while also forming an outer space between the partition and the upstanding wall having the roof. The two spaces intercommunicate via the annular space between the bottom of the partition and the melt.

Means are provided for charging the annular inner space around each electrode, with pieces of coke, not powdered but of large enough particle size to be pervious to gases, to form an annular coke bed floating on the melt and surrounding at least the tip of the electrode and, of course, including the arc, and via the coke particles of the bed, closing the open-bottomed inner space with respect to the outer space, the two spaces being in communication via the bottom of the partition, only through or under this coke bed. With this arrangement gases from reaction between the materials fed to the tip forming the arc, can flow to the outer annular space via the interface formed by the melt and coke bed floating thereon, and via the lower portion of the relatively pervious coke bed itself. The gas flow from the reaction proceeding between the powdered materials fed into the arc, flow somewhat in the form of a layer of relatively restricted height, into the outer space between the partition and the upstanding or outer wall of the apparatus, this outer space being provided with means for exhausting the gases which collect there.

The above is an improvement on the previously described patented practice in that while providing additional restraint against loss of the powdered particles possibly blown about by the action of the arc, in spite of the advantages described by the aforementioned patent, the arc flare is substantially completely intercepted by the coke bed surrounding the arc. At the same time, the arc can be struck and maintained between the tubular electrode tip feeding the powdered materials, and the melt. The coke bed has an annular formation surrounding the arc.

BRIEF DESCRIPTION OF THE DRAWINGS

The principles of this invention are schematically illustrated by the vertical cross section shown by FIG. 1, FIGS. 2, 3 and 4 each simulating horizontal cross sections and showing the contours of the outer wall and of the partitions in the cases of using multiple electrodes, variously oriented.

DETAILED DESCRIPTION OF THE INVENTION

FIG. 1 shows a relatively shallow refractory hearth which can be circular or have any of the contours shown by FIGS. 2 through 4, depending on the number and arrangement of the tubular electrodes used.

In FIG. 1 the tubular electrode is shown at 2 with its lengthwise or vertically extending feeding passage 3 down through which the powdered or fine-grained iron oxide material and carbonaceous material, intermixed, are fed. The electrode 2 may be of the Söderberg type. The previously referred to roof is shown at 4 and the upstanding wall at 5, both being preferably water-cooled. The electrode 2 passes through an opening in the roof 4 in a substantially gas-tight manner and the roof 4 and wall 5 enclose a substantially gas-tight space around the electrode.

The depending, also preferably water-cooled, partition 8 is shown as depending from the roof 4 and, as indicated by FIGS. 2 through 4, concentrically surrounds the tubular electrode 2, individually in all cases, this annular or cylindrical partition 8 depending down to a level spaced above the top level of the iron melt contained by the hearth 1. This annular space around the electrode is substantially gas-tight excepting for the annular space formed between the bottom of the partition 8 and the melt in the hearth. Within this annular space an annular bed 10 of pieces of coke is formed, the particles being charged through one or more chutes 11 extending through the roof 4. The pile 10 is made sufficiently high to extend into and choke off each of the chutes 11, the pile gravitationally forming as indicated by FIG. 1, its top level declining inwardly towards Söderberg electrode 2 and outwardly towards the partition 8, these two elements supporting the pile of coke pieces from spreading further. At its bottom the coke pile 10 flares outwardly under the partition 8 towards the outer periphery of the hearth 1, but inwardly being kept open by the action of the arc 12 struck between the electrode tip and the melt. The coke pile or bed 10 should reach upwardly a reasonably substantial distance above the tip of the electrode 2.

FIG. 1 also shows that the outer space 13 between the wall 5 and partition 8, is provided with an exhaust duct 14 through which the reaction gases can be discharged, the melt floating on the coke bed, being indicated at 15.

In operation, with the arc 12 maintained, the hearth 1 being possibly electrically conductive, but in any event, having a positive electric hearth connection, while the electrode 2 has a negative connection, both connections being supplied with current via a suitable DC power source (not shown) and with the powdered materials fed down the passage 3 of the electrode, the reaction proceeds with the attendant advantages as described in the previously-identified patent.

In addition, it can be seen that for the reaction gases to discharge from the annular space around the electrode defined by the partition 8, they must flow via the interface between the coke bed or pile 10 and the melt 15, and through the lower portion of the coke bed 10, the coke particles being sized for the permeability thus required.

The coke bed surrounding the arc performs the advantageous function of completely shielding the arc flare from the partition 8 and the roof 4. At the same time, the heat produced by the gases flowing under and through the lower portion of the annular coke pile 10, is largely confined to that lower portion by the thermal insulating value of coke, thus protecting the partition 8 and, importantly, the roof 4, to a considerable extent against being heated by the discharging gases as well as by the arc itself. However, as previously noted, it is preferred that the partition 8 be water-cooled as well as the roof 4 and wall 5, although water-cooling of these parts is not particularly illustrated.

In FIGS. 2 through 4 different arrangements of multiple arcing electrodes are shown, the electrodes being shown at 2a through 2c, depending on the number of electrodes, and the cylindrical partition 8 being indicated at 8a, 8b, etc., while the outer wall 5 is shown in each instance as being appropriately contoured, it being understood that the hearth contour could conform correspondingly.

What is claimed is:

1. An apparatus for the melt reduction of fine-grained iron oxide material mixed with fine-grained carbonaceous material, comprising a hearth for containing an iron melt, at least one vertical cathodic DC arcing electrode having a lengthwise passage through which said mixed materials are fed, the electrode having a tip positioned to form an arc with said melt to which said materials feed via the tip, a wall upstanding from said hearth and surrounding and spaced from said electrode and having a roof extending inwardly from the wall and through which said electrode extends, said wall and roof substantially gas-tightly enclosing space above and around said electrode tip and the melt, a partition depending gas-tightly from said roof into said space to a level spaced above said melt and substantially concentrically surrounding said electrode and forming an inner annular open-bottomed space therearound and an outer space between the partition and said wall, means for charging said annular inner space with pieces of coke to form an annular coke bed floating on said melt and surrounding at least the tip of said electrode and via the coke particles of the bed closing said open-bottomed inner space with respect to said outer space, gases from reaction between said materials fed to said tip when forming the arc, flowing to said outer annular space at least via the interface formed by said melt and said coke bed floating thereon, the coke bed forming a shield for radiation from the arc, and means for exhausting said gases from said outer space.

* * * * *